United States Patent [19]

Embro, Jr.

[11] 4,356,908
[45] Nov. 2, 1982

[54] METHOD AND APPARATUS FOR ALIGNING AND SEPARATING CONTAINERS OF DIVERSE SHAPES

[75] Inventor: Joseph J. Embro, Jr., Atlanta, Ga.

[73] Assignee: The Mead Corporation, Dayton, Ohio

[21] Appl. No.: 242,872

[22] Filed: Mar. 12, 1981

Related U.S. Application Data

[63] Continuation of Ser. No. 42,469, May 25, 1979, abandoned.

[51] Int. Cl.³ .............................................. B65G 47/31
[52] U.S. Cl. .................................................. 198/461
[58] Field of Search ............... 198/461, 452, 580, 430, 198/453

[56] References Cited

U.S. PATENT DOCUMENTS

| | | |
|---|---|---|
| 2,389,696 | 11/1945 | Stiles . |
| 2,936,060 | 5/1960 | Carter . |
| 3,109,529 | 11/1963 | Carter ................................. 198/453 |
| 3,162,291 | 12/1964 | Sell . |
| 3,279,580 | 10/1966 | Englander ........................... 198/452 |
| 3,323,633 | 6/1967 | Engel . |
| 3,633,728 | 1/1972 | Chamberlin . |
| 3,866,739 | 2/1975 | Sikorski . |
| 4,054,199 | 10/1977 | Polderman ......................... 198/452 |
| 4,142,636 | 3/1979 | Planke . |

Primary Examiner—John J. Love
Assistant Examiner—Brian Bond
Attorney, Agent, or Firm—Biebel, French & Nauman

[57] ABSTRACT

A conveyor system having a plurality of conveyors of increasing speeds with an angular guide member which directs incoming containers across the conveyors to the last conveyor where they are positioned in aligned and spaced relation for subsequent processing. The system is capable of sorting bottles and cartons from one another and the conveyors are sized to sort a predetermined range of dimensions of cartons and bottles and have their relative speeds governed by the ability of predetermined configurations of containers to be processed without tipping as they transfer from one conveyor to the next.

5 Claims, 4 Drawing Figures

METHOD AND APPARATUS FOR ALIGNING AND SEPARATING CONTAINERS OF DIVERSE SHAPES

This is a continuation of application Ser. No. 042,469 filed May 25, 1979 now abandoned.

BACKGROUND OF THE INVENTION

1. Field of the Invention

The present invention relates to unscrambling conveyors, and more particularly, to a conveyor system capable of aligning and separating diverse shapes of containers, such as cylindrical bottles and rectangular cartons.

2. Prior Art

There are many types of conveyor systems which have been designed for use in sorting containers, such as bottles, and aligning them for inspection or further processing. Such systems are further capable of establishing a spacing between adjacent such containers as is needed for a given process. These conveyors are used extensively in the liquid bottling industry, such as breweries or soft drink bottling facilities. Such a device is disclosed, for example, in U.S. Pat. No. 4,142,639.

Further, similar conveyor systems have been utilized in that portion of the packaging industry where rectangular cross section containers, such as boxes and cartons, need to be aligned and separated with a spacing between adjacent cartons for subsequent processing or filling in a manner similar to bottling operations. Such a device is disclosed, for example, in U.S. Pat. No. 3,866,739.

However, both of these above referred to types of devices are only designed to separate a given shape and range of sizes of containers, such as cylindrical containers, and are not designed to separate such containers from other shapes of containers, such as cartons or boxes. Thus, in those cases where there is a need for distinguishing between cartons and bottles and aligning the various shapes in spaced relation for inspection or subsequent processing, conveyor systems of the above described types have not proven effective.

Until recently, there has been very little need for a conveyor system which was capable of sorting, aligning and separating such diverse shapes as bottles and cartons. However, with the increased awareness of environmental concerns which has resulted in a desire to reduce the use of non-returnable containers and encourage the use of returnable containers, such as in the soft drink industry, a demand for such sorting systems has increased. For example, it is necessary to provide a system at grocery stores and the like, where an individual desiring to return empty bottles can position them on a conveyor, both as individual bottles and in their original carry away cartons of four, six, or eight packs as are currently being used, without the need for removing each of the bottles from the cartons in which they are returned. These bottles and cartons are then scanned by electronic equipment which determines the sizes and numbers of bottles and determines the amount of refund for bottle deposits to be given the customer. This requires a conveyor system which is capable of sorting out cartons of various lengths and widths from bottles placed adjacent to them on the conveyor and which bottles likewise have different diameters, but are of generally cylindrical configuration.

One of the main difficulties with prior art conveyors of the general type described above, is that when both cartons and bottles are placed on the infeed conveyor at random positions as is commonly encountered, the cartons block the movement of the bottles and prevent them from being correctly positioned for scanning inspection, etc.

Such prior art devices generally employ a plurality of individual conveyor belts disposed in parallel side-by-side abutting relation with a diverting bar extending at an angle transversely across the plurality of belts so that objects placed on the infeed conveyor are progressively moved across from belt to belt until they reach the exit conveyor for subsequent processing. In addition, the plurality of the belts are usually driven at progressively higher speeds with the infeed belt being driven at the slowest speed and the exit belt being driven at the highest speed. The reason for this is that the infeed of objects is usually accomplished at a lower rate than is desirable for subsequent processing and thus the objects must be brought up to speed before they enter the processing device.

However, there has been no recognition of the advantages of using progressively higher speed belts for the purpose of separating bottles and cartons, and even further, there has been no recognition of the advantages of varying the widths and speeds of the belts and the angle at which the objects to be aligned and separated are passed across the progressively increasing speed belts, in order to assist in separating diverse shapes of containers such as bottles and cartons.

SUMMARY OF THE INVENTION

The present invention overcomes the above described disadvantages and difficulties with prior art devices and further recognizes the advantages of the use of progressively increasing speed belts in a conveyor system and the inter-related factors of speed and angle of progression across the belts, in order to sort such diverse shapes of containers as rectangular cartons and generally cylindrical bottles.

These advantages are accomplished in accordance with the method of the present invention by placing cartons and cylindrical containers at random positions on a first conveyor having a portion thereof in side-by-side relation with a second conveyor, conveying the cartons and containers forwardly on the first conveyor at an appropriate speed, toward a fixed guide rail extending angularly across the first conveyor at an angle such that a container which is initially positioned closely behind a carton will engage the carton and travel peripherally clear of the carton and toward the guide rail while the guide rail urges the carton and the container sidewardly toward the second conveyor and before the carton leaves the first conveyor. The method further includes moving the second conveyor forwardly at a higher speed than the first conveyor in order to produce front to rear separation between adjacent cartons and containers. It is further desirable that the second conveyor have a width narrower than the narrowest dimension of any of the cartons and that the guide rail extends across the full extent of the second conveyor, and a third conveyor is positioned on the opposite side of the second conveyor from the first, and further that the third conveyor is moved forwardly through the discharge region of the guide rail at a higher speed than the second conveyor, for conveying the cartons and containers. The cartons are transferred from the first conveyor and the containers are transferred from the second conveyor, onto the third conveyor.

The advantages over prior art devices are especially accomplished through the use of a conveyor apparatus having at least two conveyor means disposed for at least a portion of their lengths in parallel side-by-side adjacent relation with a first of the conveyor means being utilized as an infeed conveyor for receiving containers, and a second of the conveyor means moving at a faster speed than the first and in the same direction, and a flow directing or diverting means for directing the movement of the containers from the first conveyor means across to the second at an angular path relative to the direction of movement of the conveyor means. The width of the first conveyor means and the speed of movement of the first conveyor means as well as the angle of the angular path of movement established across it by the directing means, are such that if a cylindrical container is disposed against the side of the carton extending perpendicular to the direction of movement of the carton and adjacent the corner of the carton remote from the directing means, when the carton is disposed with one side fully engaging the directing means and moving along the angular path, it will traverse the length of the side, due to relative rotational movement between the carton and the cylindrical container, before the carton changes speed, due to being picked up by the second conveyor means, so that both the carton and the cylindrical container will be positioned against the directing means and thus be spaced by the change of speed as the carton and cylindrical container are sequentially picked up by the second conveyor means.

In addition, the sizing of the width of the first conveyor, the speed of movement of the first conveyor and the angle of the angular path of movement established by the directing means are further such that if the cylindrical container is initially disposed on the rear corner of the carton adjacent the further side thereof which extends parallel to the direction of movement of the carton across the first conveyor means when the carton is disposed with one side fully engaging the directing means and moving parallel to said angular path, it will traverse the length of the further side due to relative rotational movement there along and will further traverse the distance from the adjacent forward corner of the carton to the next corner, but not along the adjacent side, before the carton changes speed, due to being picked up by the second conveyor.

These various parameters, i.e. number of conveyors, width of each conveyor, speed of movement of each conveyor and the angle of path of movement across the conveyors, are all interrelated as variables which must be adjusted for a given system to accommodate a predetermined range of lengths and widths of cartons and diameters of cylindrical containers to be separated and aligned. The conditions expressed regarding the positioning of a cylindrical container on an outer corner of a carton are considered the worst conditions under which the conveyor system must operate to separate the cylindrical containers from the cartons. Other relative positionings between a carton and a cylindrical container permit easier separation between the two than the worst conditions expressed above.

In addition, there are limits on the speed ranges in which the conveyor system must be operated and on the increase in speed from the infeed belt and each subsequent belt as the speed of objects are increased to the exit belt speed. Basically, the change in speed between two adjacent belts must not exceed a velocity which will result in an acceleration of a given cylindrical container size such that would cause it to tip over as it progresses from one belt to the next.

In a preferred form, three progressively increasing speeds of belts are utilized with the center belt being only approximately a third of the width of the infeed conveyor belt. The exit conveyor is run at a speed of 104 feet per minute and each of the preceeding conveyors has a lower speed from its immediately succeeding conveyor by a ratio of 2.5:1. In other words, the infeed conveyor moves at approximately 17 feet per minute and the second, narrow intermediate conveyor, runs at approximately 42 feet per minute.

The means for diverting the flow of containers across the three conveyors is merely a member providing a vertical guide surface against which the containers are forced by the movement of the belt and which, because of the lateral component of force due to friction between the containers and the belts, causes the containers to move laterally at an angle across the belts. In this preferred form the angle of this surface relative to the direction of movement of the conveyors is approximately 27°.

This configuration works very efficiently for separating the general range of sizes of cartons which contain soft drink bottles, from individual soft drink bottles which are randomly placed on the conveyor belt. By the time the containers, both cartons and bottles, reach the third conveyor belt, they are all aligned against the vertical surface of the diverting member and are spaced sufficiently that upon proceeding down the exit conveyor they can be scanned for size, color, etc. Through utilization of proper circuitry (as described, for example, in United States Application Ser. No. 042,468 filed concurrently herewith) a ticket is printed out with the amount of the refund for deposits on the bottles which have been returned.

DETAILED DESCRIPTION OF THE PREFERRED EMBODIMENT

The present invention is a conveyor system which is designed especially for use in conjunction with scanning apparatus for determining the sizes and numbers of bottles which pass by the scanning apparatus on a conveyor belt. This system is intended to be utilized at retail locations, such as grocery stores, where returnable bottles and the like need to be sorted and their value determined in order to provide an appropriate refund to an individual consumer who returns the bottles to the store after use. The scanning system and its associated circuitry is designed to determine the value of the bottles and print out a slip for the customer indicating the amount of return of deposit for the bottles. Such a system is disclosed in copending application Ser. No. 042,468 filed concurrently herewith and reference should be made to that application and to Ser. No. 924,855 filed July 17, 1978 for details of the circuitry and scanning apparatus.

It is contemplated, however, that the conveyor system of the present invention can be utilized in other environments, such as in bottling factories, where random sizes of bottles as well as cartons containing bottles might need to be sorted, spaced and aligned prior to their being subsequently processed. Therefore, although the present invention is described in the environment of such a sorting apparatus as mentioned above, it is not intended to be a limit upon the use of such a device.

Figure 1:
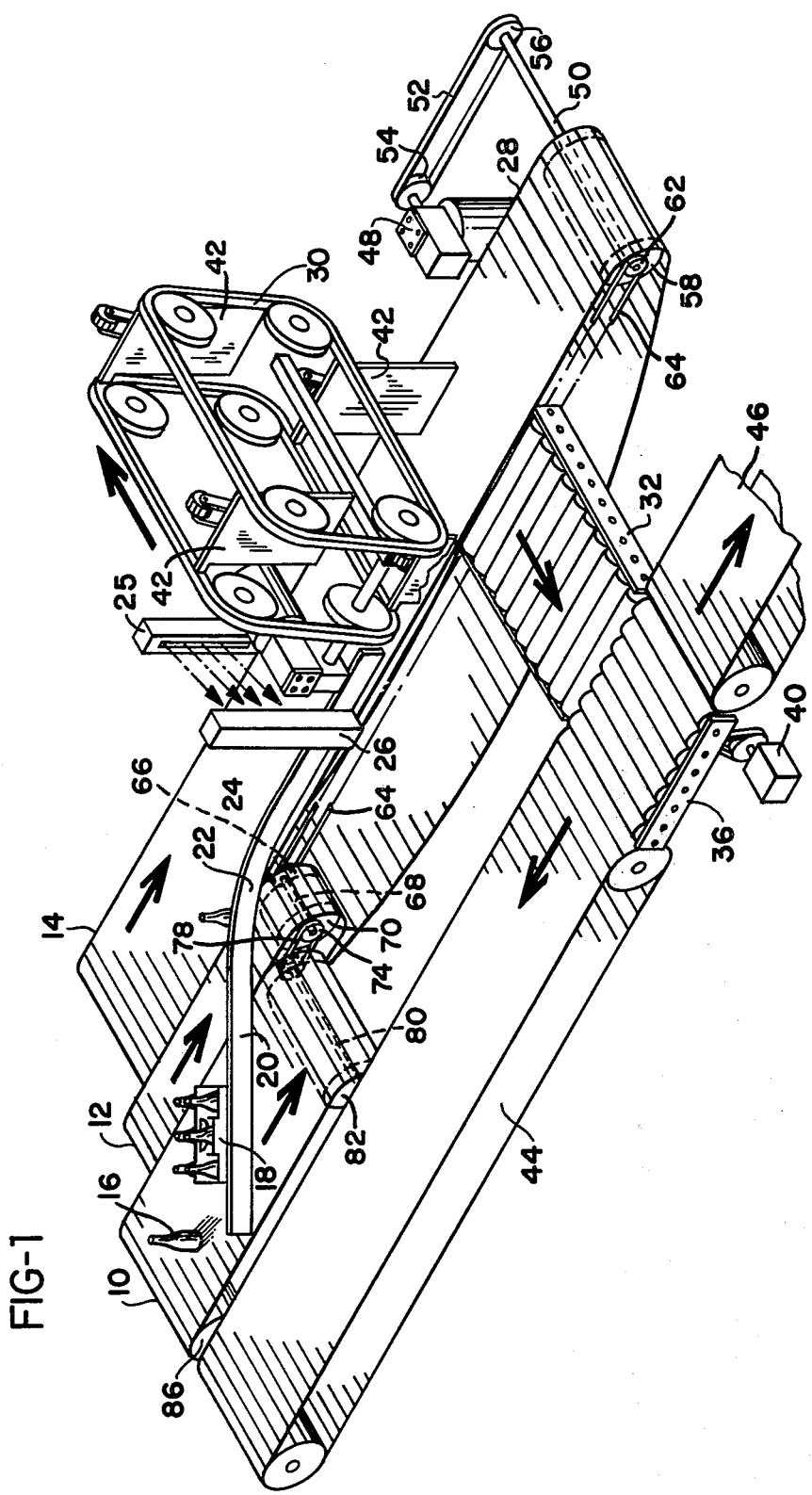
FIG. 1 is a pictorial illustration of a preferred embodiment of the present invention in conjunction with a scanning station for determining the size and numbers of bottles passing along the exit conveyor.

As illustrated in FIG. 1, the basic conveyor system of the present invention in its preferred form includes three conveyor belts 10, 12 and 14 preferably made of or coated with a low friction material such as acetal and which are disposed in adjacent, horizontally cascading relationship so that the bottles 16 and cartons 18 to be sorted, aligned and spaced will progressively move laterally across the belts. The means for directing the movement of bottles 16 and cartons 18 is a metal guide rail 20 preferably coated with a low friction material such as ultra high molecular weight polyethylene on a vertical surface thereof inclined to the direction of movement of each of the conveyor belts 10 and 12, against which the bottles 16 and cartons 18 are driven by movement of the conveyors and which surface results in the lateral movement of the containers. In order to provide a smooth transition from conveyor belt 12 to conveyor belt 14 a radiused portion 22 is provided in the guide rail 20, and a subsequent portion 24 of the guide rail extends parallel to the direction of movement of conveyor belt 14 and acts as a positioning surface to place the bottles in the right position for illumination by an illuminator 25 and scanning by the scanning device 26. The guide rail is held stationary in position by the frame structure (not shown) and resists the forward movement of containers placed on the infeed conveyor 10.

Conveyor belt 10 acts as an infeed conveyor, and bottles and cartons are initially placed on the leading edge of this conveyor belt by the customer. The forward movement of the belt then causes the containers to be driven into the guide rail 20. The containers then move along the guide rail due to the lateral component of the force of friction between the bottom surfaces of the containers and the surface of conveyor belt 10. The relative movement of the containers, and particularly the relative movement between the bottles 16 and cartons 18 on the conveyor belt 10 as they progress laterally thereacross, is an important aspect of the present invention and is described in detail below in connection with FIGS. 2, 3 and 4. Essentially, however, all of the containers are eventually driven against the surface of the guide rail 20 and moved laterally across belt 10 and then the intermediate belt 12 and are eventually picked up by the conveyor belt 14, which acts as an exit conveyor for the system of the present invention and moves the containers to the scanning station and to the subsequent processing equipment.

After the containers have been scanned by the scanning device 26 they progress along exit conveyor 14. In all cases, the bottles 16 will continue along the length of exit conveyor 14 to the terminal end portion 28 thereof from which they are removed by an operator or or otherwise disposed of through additional operating equipment (not shown) which forms no part of the present invention. All cartons 18 which pass through the scanning device 26 are removed from exit conveyor 14 by the paddle wheel device 30 and pushed onto and across the roller conveyor 32 in the direction of the arrow. The cartons 18 are moved along conveyor 32 and subsequently onto conveyor 36 which has its rollers driven by drive motor 40.

The electrical circuitry associated with the scanning device 26 controls operation of the paddle wheel device 30 so that each time a carton containing a plurality of bottles is sensed by the scanning device 26 it will be removed from belt 14 by a paddle 42 onto and across the conveyor 32 to the next roller conveyor 36 whose motor 40 is also controlled by scanning device 26. As regards the movement of the roller conveyor 36, the scanning device 26 determines whether or not a carton contains a complete set of bottles, i.e. whether there are bottles in each cell position within the carton.

If the scanning device 26 determines that there is an insufficient number of bottles it will activate the motor 40 to rotate the rollers in roller conveyor 36 to return the rejected carton by a gravity or roller conveyor 44. If, however, the scanning device 26 determines that the carton has the requisite number of bottles it will activate motor 40 to rotate the rollers of roller conveyor 36 to move the carton to the powered or gravity roller conveyor 46 which then carries away the acceptable cartons for subsequent processing. The details of operation of the paddlewheel device, and conveyors which subsequently move the cartons are disclosed in application Ser. No. 924,854, filed July 17, 1978, to which reference should be made for such details.

Referring now to the drive mechanism for conveyor belts 10, 12 and 14, a motor 48 drivingly engages a drive shaft 50 through chain 52 and sprockets 54 and 56. Mounted on drive shaft 50 is a drive sprocket 58 which engages the bottom side of conveyor belt 14 in a conventional manner to drive and support it. All of the various sprockets referred to above are appropriately sized for a speed reduction from the speed of rotation of the motor to the proper speed of rotation of sprocket 58 to drive conveyor belt 14 at the appropriate linear speed which, in the case of the preferred embodiment, is taken as approximately 104 feet per minute. This speed appears to be an appropriate speed for the use in connection with which this invention is presently being described. However, the speed of conveyor 14 can be varied considerably depending upon the various parameters discussed below.

The belt 14 is supported at its opposite end by an idler sprocket (not shown) and is maintained taught on the upper surface between this sprocket and sprocket 58 in order to support the cartons and bottles thereon. A further sprocket 62 is also secured to drive shaft 50 and is driven thereby and in turn via chain 64 drives a further sprocket 66 mounted to a drive shaft 68. Drive shaft 68 extends under the upper surface of conveyor belt 12 and has a further sprocket 70 secured thereto for rotation therewith and which engages the bottom surface of conveyor belt 12 for driving the same. Sprockets 62 and 66 are sized to provide the appropriate reduction in rotational speed so that conveyor belt 12 moves at a slower speed than conveyor belt 14. The opposite end of conveyor belt 12 from that supported by sprocket 70 is supported by an idler sprocket (not shown), as is the case with conveyor belt 14.

A further sprocket 74 is also drivingly supported by drive shaft 68 and in turn drives a further sprocket 76 with chain 78. Sprocket 76 is secured to a further drive shaft 80 which has mounted thereon a drive sprocket 82 which engages the bottom surface of conveyor belt 10 to rotate the belt. Again, the size of sprockets 74 and 76 is chosen such that the speed of movement of conveyor belt 10 is less than the speed of conveyor belt 12. Also, an idler sprocket 86 supports the opposite end of conveyor belt 10 from sprocket 82 in the same manner as belts 12 and 14 are supported.

As mentioned above, in the preferred form for the specific use in which the present invention is being described, it is desirable that the surface speed of conveyor belt 14 be approximately 104 feet per minute. Although the exact speeds of the belts are not critical, the ratios of increase in speed between each belt is important and there are several factors which affect the speed ratios between adjacent belts that may be used in a given system. For example, the stability of the containers and particularly the bottles, must be considered in the transition from one belt to the next since a speed ratio between the belts which is too high will cause the bottles to topple and thus prevent them from being properly aligned and spaced for movement through the scanning device 26. Likewise, the relative spacing desired between adjacent containers, whether they be bottles or cartons or combinations thereof, will affect the selection of the speeds and ratios of increase between belts, since the progressively increasing speeds will determine the spacing between the adjacent objects. And a further factor of substantial importance is in the relationship of relative movement between the bottles and the cartons as they move along a conveyor and onto an adjacent conveyor such that the bottles will be displaced along the cartons, so that they eventually come to engage the guide rail 20 and will be properly aligned.

This later factor is further affected by the width of each conveyor belt as well as the number of conveyor belts and the angle of transverse movement across the various belts due to the angle of the guide rail relative to the direction of movement of the belts. All of these factors are interrelated in a complex manner for which no empirical formulation has yet been derived, but which act together to produce the desirable effects of permitting separation of bottles from cartons and aligning and separating them at appropriate spacings against the guide rail 20 by the time the objects enter the region of the scanning device 26.

By consideration of these parameters in regard to the preferred embodiment and specifically the example described in which the exit conveyor belt 14 is operated at 104 feet per minute, it has been determined that an infeed belt width of 10 inches running at a speed of approximately 17 feet per minute and an intermediate conveyor belt 12 having a width of $3\frac{1}{4}$ inches and a speed of 42 feet per minute with the angle of the guide rail 20 relative to the direction of movement of conveyor belt 10 being approximately 27°, produces the desired result of being able to separate the various combinations of cartons and bottles in the ranges of sizes which are generally returned by consumers for deposit refund.

Undoubtedly there can be some variation in the widths of the belts as well as the speeds at which they are run, although an attempt has not been made to bracket the acceptable parameters. The speeds utilized for the belts are approximately an increase of 2.5 times the speed of the preceding belt and it is believed that a speed ratio in the range of $2\frac{1}{2}$ to 3 is acceptable, although this should not be considered the absolute upper and lower limits of acceptable ranges since the parameters referred to above governing the increase in speed between two adjacent belts are the ultimate controlling factors in a given installation. Further, the general range of sizes of cartons and diameters and centers of gravity of common bottles are a limiting factor in satisfactory operation of this device, and if other sizes of cartons and bottles or other cylindrical containers are to be sorted, the sizes of each will affect satisfactory operation of the device, and modifications may be necessary in order to get the appropriate alignment and separation for subsequent processing in a different environment.

Further, as mentioned above, it is not necessary to have three belts in order to accomplish the desired alignment and separation of randomly disposed cartons and bottles. In some instances, where the range of lengths and widths of the cartons and the diameters of the bottles are appropriate, they can be adequately separated through the relative movement of two belts rather than three. Likewise, it may be that in some ranges of container dimensions further belts are necessary in order to obtain the proper sorting of the diverse container shapes.

As an example only of the sizes of cartons which are generally encountered in the soft drink industry and the like, in which 4, 6 or 8 bottles are usually carried, they generally come in three sets of dimensions in rectangular cross section: $4\frac{3}{4} \times 7\frac{1}{2}$ inches for a package of six, such as six, twelve ounce soft drinks; $9\frac{1}{4} \times 9\frac{1}{4}$ inches for a package of four, such as two liter soft drink bottles; or $6 \times 11\frac{3}{4}$ inches for a package of eight, such as sixteen ounce soft drink bottles. However, this is just a general indication for the aceptable range of dimensions, since there are several other slightly different dimensions of cartons for various dimensions of bottles generally available to the consumer today, particularly for containing soft drinks and the like. Likewise, as an example, the diameters of the bottles generally encountered in the soft drink industry are in the range of about $2\frac{3}{8}$ to $3\frac{1}{2}$ inches.

The problem which is encountered if the appropriate range of sizes of conveyor belts and speeds thereof are not utilized for a given size of cartons and bottles is that with certain positioning of bottles relative to cartons as they are initially placed on the infeed conveyor in random fashion by the consumer, the bottles will not attain a position of alignment along the guide rail 20 since they will not peripherially clear the cartons and will instead remain resting against a side of a carton in a position which will not allow proper scanning and evaluation by the scanning device 26. For example, a bottle could end up immediately against the back or forward edge of a carton with insufficient spacing for the scanning device to function properly, or it could ride on the outer edge of the carton rather than against the guide rail 20 and result in jamming of the apparatus or erroneous readings on the scanning device due to having three bottles in alignment instead of two, as the scanning device is equiped to read. Likewise, if the cartons are not positioned properly along the guide rail 20 so that the bottles are only two deep in the direction perpendicular to the guide rail before they pass the scanning device 26, this will cause an erroneous reading by the scanning device.

It is believed that there are two particularly severe conditions to overcome in order to properly separate and align randomly placed cartons and bottles. These conditions must be considered in adjusting the parameters of widths and speeds of the belts and angle of the guide rail. These conditions are illustrated schematically in FIGS. 2 and 3. The first such severe condition, as illustrated in FIG. 2, is where a bottle 16 has been placed along the back surface of a carton, not necessarily engaging the surface but close thereto, but which results in the bottle remaining along that surface as the bottle and carton are transferred from one conveyor to another, unless the above referred to parameters are properly adjusted.

Figure 2:
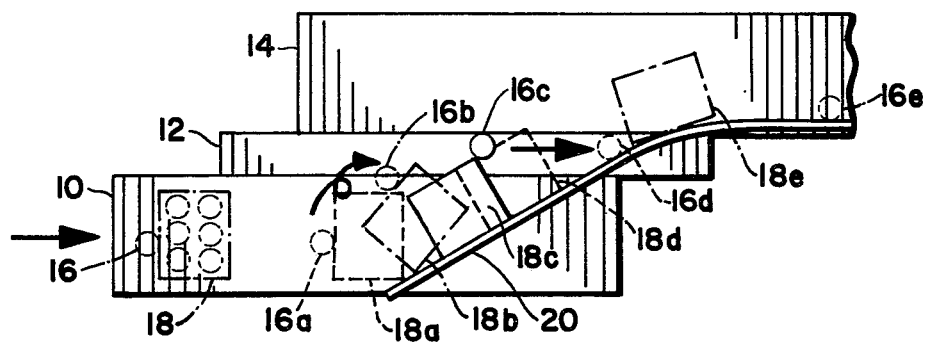
FIG. 2 is a schematic top plan view of the conveyor system of the present invention illustrated in FIG. 1, showing sequential movement of a carton and a bottle from a given initial relative position.

As the carton and bottle are initially moved forward to the first dotted line position illustrated in FIG. 2 in which the carton 18a first strikes the guide rail 20, the forward movement of the infeed conveyor 10 forces the bottle 16a into the side of the carton since the forward movement of the carton has been retarded by the guide rail. The carton is then rotated to the dotted line position of carton 18b due to the functional engagement between the carton and the conveyor belt 10 and at the same time the bottle 16b is rotated clockwise as seen in FIG. 2 and moves along the surface of the carton 18b towards its forward most end as the carton 18b rotates to the position where its side is completely engaged with the guide rail, as illustrated by carton 18c.

If, at this point, only a single belt were being used or a plurality of belts which were not sized and driven within the appropriate parameters, the bottle 16c could remain positioned on the corner of the carton 18c as shown in FIG. 2, i.e. not peripherally clear thereof, which is undesirable and which might result in defective scanning. However, utilizing the present invention, at this point the bottle 16c is being carried by conveyor 12, which is moving at a faster speed than conveyor 10 upon which the carton 18c still remains. This results in relative motion between the carton 18c and the bottle 16c, so that as the carton and bottle reach the further dotted line positions 18d and 16d, respectively, the bottle will be carried against the guide rail 20 in spaced relation to the side of carton 18d. As the carton and bottle continue to be driven along the guide rail, they are both eventually picked up by the exit conveyor 14 as shown by the further dotted line positions of the carton and bottle 18e and 16e, respectively, and since at that point they are both being driven by the same conveyor in a direction parallel to the conveyor 14 they will continue to remain at that spacing as they pass through the subsequent scanning device.

It is to be noted that due to the fact that intermediate conveyor 12 is of substantially lesser width than the carton, the carton will bridge the intermediate conveyor and will experience a speed change from that of the infeed conveyor 10 to the speed of the exit conveyor 14 while the bottles will experience an intermediate increase in speed as they are carried by the intermediate conveyor 12. This has two advantages. First, it permits the bottle in the situation illustrated in FIG. 2 to be advanced in the direction of movement of the conveyor, away from the front surface of the carton, and this produces the desired spacing between the carton and the bottle. Second, the intermediate step permits the bottle's speed to be increased less abruptly than would be the case if only two belts were used, and thus the possibility of tipping the bottle is reduced.

Figure 3:
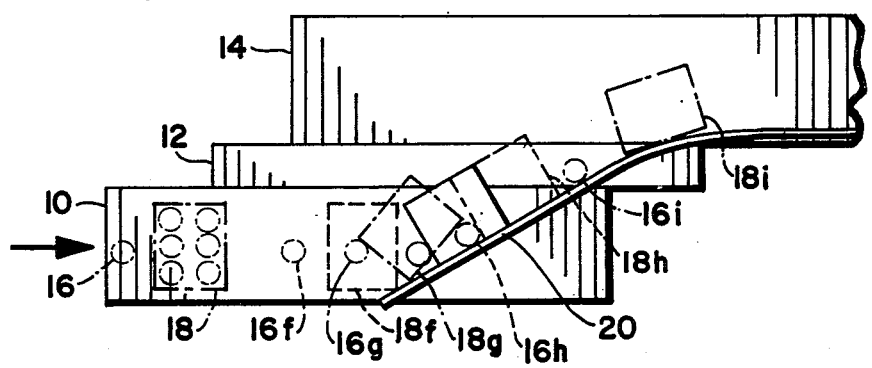
FIG. 3 is a view similar to FIG. 2 with the carton and bottle in a different relative position and showing a different sequence of movement thereof.

Reference is now made to FIG. 3 for a discussion of the other above mentioned severe condition. In this case a bottle 16f is positioned initially somewhat further back from a carton than in the case of FIG. 2. As the carton 18f first impacts guide rail 20 and begins to rotate to the position of carton 18g, the bottle 16f is driven forward into the edge of carton 18g. When the bottle is in this position it must progress along the side of the carton and engage the guide rail 20 before the carton passes onto the exit conveyor 14, i.e. become peripherially clear of the carton, in order to obtain proper spacing before the carton and bottle are both carried by the exit conveyor. With a single belt this may not occur unless the path of movement of the bottle and carton along the belt is long enough and the angle along the guide rail is appropriate. However, in the preferred embodiment of the present invention this is taken care of by the appropriate angle of the guide rail 20 and the speed of movement of the three conveyor belts. Thus, by the time the carton 18h has progressed close to the point where it will bridge intermediate conveyor 12 and will be picked up by exit conveyor 14, bottle 16h will have moved along the side of carton 18h and have been guided by guide rail 20 along the backside of the carton towards the exit conveyor 14. As the carton 18i is picked up by conveyor 14 it is carried away from the bottle 16i, and thus an appropriate spacing is established between the carton and the bottle while the bottle is carried by the intermediate belt 12.

Figure 4:
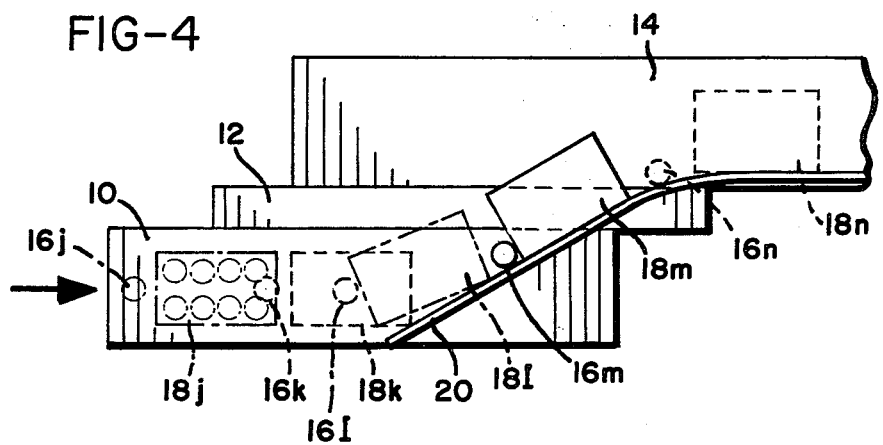
FIG. 4 is a view similar to FIGS. 2 and 3 with the carton and bottle in yet another relative position and showing a different sequence of movement thereof.

Although the conditions referred to above with reference to FIGS. 2 and 3 are considered two of the more severe operating conditions under which the preferred embodiment of the present invention must function, it is contemplated that the great majority of cartons and bottles will be placed upon the entrance conveyor 10 in the positions 18j and 16j as illustrated in FIG. 4. From past experience, it appears that customers tend to place cartons which are longer than they are wide, such as a normal soft drink six pack, so that the long side is positioned parallel to the direction of movement of the conveyor, as is illustrated by the carton 18j in FIG. 4. Although the position of a bottle 16j is somewhat random and can be positioned anywhere across the width of the carton, it is also common for the bottles to be placed generally in the position illustrated in FIG. 4 which is roughly in the middle of the infeed conveyor 10.

The carton and bottle will then progress along the infeed conveyor 10 in their intially disposed relative positions until the carton reaches the position 18k where its front corner engages the guide rail 20. The bottle 16k will maintain its relative position to the carton until the carton strikes the guide rail 20 since there is nothing acting on the carton and the bottle to change their relative speeds or direction of movement. However, as the carton strikes the guide rail it begins to slide forward along the guide rail as illustrated by the position of carton 18l. Since a component of the velocity of the carton is directed sidewardly across the infeed conveyor 10 due to contact with the guide rail 20 its speed in the direction of conveyor 10 will decrease and thus the bottle will catch up with the carton and eventually impact the back side of the carton as is illustrated by the position of bottle 16l.

As the carton and bottle then progress along the guide rail 20, for example, to the position illustrated by bottle 16m and carton 18m, the bottle will rotate in the counter clockwise direction along the back side of the carton and towards the guide rail until it engages the guide rail as shown by the position of bottle 16m. The bottle will then remain in contact with the back surface of the carton until the carton is picked up by the exit conveyor 14 which then produces a separation between the bottle and carton as illustrated by the relative positions of bottle 16n and carton 18n. The bottle and carton are then moved in this spaced relation along conveyor 14 against the guide rail 20 and through the scanning device.

It is to be noted that it is not necessary in the preferred embodiment that the bottle completely attain a position such as 16m before the carton is picked up by the conveyor 14 since in the preferred embodiment the intermediate conveyor 12 can speed up the bottle so that if the carton is carried clear by the exit conveyor 14 the bottle can be moved forward into the guide rail 20 before it is picked up by the exit conveyor. In other words, the bottle need not completely travel along the back side of the carton since the remaining distance to the guide rail can be overcome by movement of the intermediate conveyor for the relative sizes of bottles and cartons in the ranges commonly encountered. Thus, although under these circumstances the bottle is not engaged with the side rail 20 prior to the carton passing from the infeed conveyor 10 to the exit conveyor 14, it is, in essence, peripherially clear of the carton since its movement to the guide rail will not be inhibited by the carton and will not be prevented from being in properly aligned and spaced relation along the guide rail and relative to the carton.

As used in the present specification, the term "peripherially clear" has been defined in connection with those specific cases illustrated in FIGS. 2–4. However, the term essentially means that the bottle is moved to a position relative to the carton, or vice versa, such that neither will interfere with the proper alignment and spacing between adjacent cartons and bottles as they are picked up by the exit conveyor 14.

As noted above, it is essential that the cartons be so oriented by the time they reach the exit conveyor 14, such that in the direction perpendicular to the guide rail 20 the bottles in the cartons are only two deep. This is accomplished in the preferred embodiment of the present invention for the ranges of sizes of bottles and cartons mentioned above as well as others of those approximate sizes commonly encountered in the industry. However, there is a complex interrelation between the frictional engagement of the cartons with both the conveyors and the wall, the shapes of the cartons and the angle of the guide rail such that if proper care is not taken in the design, a carton may be positioned with its short side against the guide rail which will prevent proper scanning and these conditions should be taken into account for given ranges of sizes of cartons for which the particular design of conveyor system is intended to be utilized.

Although the foregoing illustrates the preferred embodiment of the invention, other variations are possible. All such variations as would be obvious to one skilled in this art are intended to be included within the scope of the invention as defined by the following claims.

What is claimed is:

1. Method of aligning and separating a diverse group of generally rectangular cartons and generally smaller cylindrical containers, comprising the steps of:
    (1) placing said cartons and containers at random positions on a first conveyor having a portion thereof in side-by-side relation with a second conveyor;
    (2) conveying said cartons and containers forwardly on said first conveyor toward a fixed guide rail extending angularly across said first conveyor at an angle such that a container which is initially positioned closely behind a carton will engage the carton and travel clear of said carton while said carton moves along said guide rail and before the carton leaves said first conveyor,
    (3) moving said second conveyor forwardly at a higher speed than said first conveyor said second conveyor having a width which is narrower than the narrowest dimension of any of said cartons and wherein said guide rail extends across the full extent of said second conveyor, and;
    (4) moving a third conveyor forwardly through the discharge region of said guide rail at a higher speed than said second conveyor, for conveying said cartons and containers, said cartons being transferred from said first conveyor onto said third conveyor and said containers being transferred from said first conveyor to said second conveyor and then to said third conveyor.

2. A method as defined in claim 1 including running said second conveyor means at a speed ratio of at least $2\frac{1}{2}$ times greater than the speed of said first conveyor means.

3. A method as defined in claim 2 and further including the steps of running said third conveyor means in the same direction as said first and second conveyor means at a speed ratio at least $2\frac{1}{2}$ times greater than the speed of said second conveyor means, and sizing said second conveyor means narrower than said first and third conveyor means sufficiently that the smallest carton in said predetermined range of dimensions thereof will bridge said second conveyor means to said third conveyor means so that its speed will first be governed by said first conveyor means and then by said third conveyor means.

4. A method as defined in claim 3 wherein said first conveyor means is run at a speed of approximately seventeen feet per minute, said second conveyor means at approximately forty-two feet per minute and said third conveyor means at approximately one-hundred four feet per minute and said guide roll being disposed at an angle relative to the direction of movement of said conveyor means of approximately twenty-seven degrees.

5. A method as defined in claim 4 wherein the width of said first conveyor means is sized to approximately the maximum width of said predetermined range of dimensions of said cartons and said second conveyor means is sized to approximately one-third the maximum width of said predetermined range of dimensions of said cartons.

* * * * *